United States Patent
Glaesser et al.

(10) Patent No.: US 8,096,215 B2
(45) Date of Patent: Jan. 17, 2012

(54) METHOD FOR CUTTING FREEFORM SURFACES, CUTTING TOOL AND USE OF THE CUTTING TOOL

(75) Inventors: Arndt Glaesser, Dachau (DE); Stefan Heinrich, Adelshofen (DE)

(73) Assignee: MTU Aero Engines GmbH, Munich (DE)

( * ) Notice: Subject to any disclaimer, the term of this patent is extended or adjusted under 35 U.S.C. 154(b) by 626 days.

(21) Appl. No.: 10/557,625

(22) PCT Filed: Apr. 17, 2004

(86) PCT No.: PCT/DE2004/000809
§ 371 (c)(1),
(2), (4) Date: Oct. 18, 2007

(87) PCT Pub. No.: WO2004/104715
PCT Pub. Date: Dec. 2, 2004

(65) Prior Publication Data
US 2008/0050184 A1 Feb. 28, 2008

(30) Foreign Application Priority Data

May 17, 2003 (DE) ................... 103 22 342

(51) Int. Cl.
*B23B 3/00* (2006.01)
*B23B 5/00* (2006.01)
(52) U.S. Cl. ................. 82/1.11; 82/118; 407/53
(58) Field of Classification Search .......... 407/53, 407/54, 62, 42; 82/1.11, 118
See application file for complete search history.

(56) References Cited

U.S. PATENT DOCUMENTS

| 4,666,352 A | 5/1987 | Nagao et al. |
| 4,968,195 A | 11/1990 | Hayakawa et al. |
| 6,684,742 B1 * | 2/2004 | White .............. 82/1.11 |
| 6,708,865 B2 * | 3/2004 | Yoshinaga .............. 228/112.1 |
| 7,373,706 B2 * | 5/2008 | Savoie .............. 29/27 C |
| 2003/0039547 A1 | 2/2003 | Bourgy et al. |
| 2010/0172703 A1 | 7/2010 | Neubold |

FOREIGN PATENT DOCUMENTS

| DE | 196 07 192 | 1/1997 |
| DE | 10 2007 010 163 | 9/2008 |
| EP | 0 453 627 | 10/1991 |
| EP | 1 285 714 | 2/2003 |
| JP | 11 156620 | 6/1999 |
| JP | 11-156620 | 6/1999 |
| JP | 11-156621 | 6/1999 |
| JP | 11 156621 | 6/1999 |

(Continued)

OTHER PUBLICATIONS

Patent Abstracts of Japan, vol. 1999, No. 11, Sep. 30, 1999.

(Continued)

*Primary Examiner* — Will Fridie, Jr.
(74) *Attorney, Agent, or Firm* — Kenyon & Kenyon LLP

(57) ABSTRACT

In a method for cutting freeform surfaces, a workpiece is cut by a cutting tool such that a desired freeform surface may be achieved, the cutting tool for cutting purposes being moved along at least one defined cutting path relative to the workpiece. A cutting tool is used, the tool head of which has a greater radius than a tool shank of the cutting tool.

8 Claims, 1 Drawing Sheet

FOREIGN PATENT DOCUMENTS

JP          2007-229849          9/2007

OTHER PUBLICATIONS

Kai et al., "Offsetting Surface Boundaries and 3-Axis Gouge-Free Surface Machining," Computer-Aided Design, vol. 27, No. 12, pp. 915 to 927, Dec. 1, 1995, XP004022745, ISSN 0010-4485.

Huang Yunching et al., "Non-Constant Parameter NC Tool Path Generation on Sculptured Surfaces," International Journal of Advanced Manufacturing Technology, 1994, vol. 9, No. 5, pp. 281 to 290, XP000570562, ISSN 0268-3768.

Xiong-Wei, "Five-Axis NC Cylindrical Milling of Sculptured Surfaces," Computer-Aided Design, vol. 27, No. 12, pp. 887 to 894, Dec. 1, 1995, XP004022742, ISSN 0010-4485.

Patent Abstracts of Japan Bd. 1999, Nr. 11, Sep. 30, 1999.

Tang, et al., *"Offsetting surface boundaries and 3-axis gouge. free surface machining,"* Computer-Aided Design 27(12): 915-927, 1995.

Huang, et al., *"Nan-constant parameter NC fool path generation on sculptured surfaces,"* Int. J. Adv. Manuf. Technol. 9: 281-290, 1994.

European Office Action for European Patent Application No. 04728095.3, dated Nov. 19, 2008.

* cited by examiner

METHOD FOR CUTTING FREEFORM SURFACES, CUTTING TOOL AND USE OF THE CUTTING TOOL

FIELD OF THE INVENTION

The present invention relates to a method for cutting freeform surfaces, to a cutting tool and to the use of the cutting tool.

The present invention relates to the area of cutting technology, e.g., to HSC cutting (high-speed cutting), which is also referred to as HPC cutting (high performance cutting).

BACKGROUND INFORMATION

Conventionally, so-called spherical cutters are used for cutting freeform surfaces. Such spherical cutters have a tool shank and a tool head attached to the tool shank, a radius of the tool head corresponding to a radius of the tool shank in the spherical cutter. The tool head therefore does not protrude laterally beyond an outer lateral surface of the tool shank.

For minimizing undesired residual lines formed during cutting, the use of a spherical cutter entails restrictions with respect to the line spacing to be maintained between the cutting paths of the cutting tool. This results in a relatively high number of required cutting paths, which determines the time required for cutting. From the point of view of high-speed cutting or high-performance cutting, however, short cutting times may be desirable.

SUMMARY

According to an example embodiment of the present invention, a workpiece is cut by a cutting tool such that a desired freeform surface may be obtained. For cutting purposes, the cutting tool is moved along at least one defined cutting path relative to the workpiece. A cutting tool (a so-called special cutter) is used, the tool head of which has a greater radius than a tool shank of the cutting tool, without, however, the tool head protruding laterally beyond an outer lateral surface of the tool shank. This may provide that cutting results in low residual line formation. Accordingly, it may be possible to increase the line spacing during cutting and reduce the time required for cutting.

First cutting paths may be produced by using a spherical cutter, its radius of the tool head corresponding to the radius of the tool shank. From these first cutting paths, second cutting paths are produced for the cutting tool to be used, the tool head of which has a greater radius than a tool shank of the same. This may allow for a particularly simple and quick production of the cutting paths for the cutting tool to be used. This may be used when the CAM system used does not support special cutters.

Example embodiments of the present invention are explained in more detail below with reference to the appended Figures.

DETAILED DESCRIPTION

Figure 1:
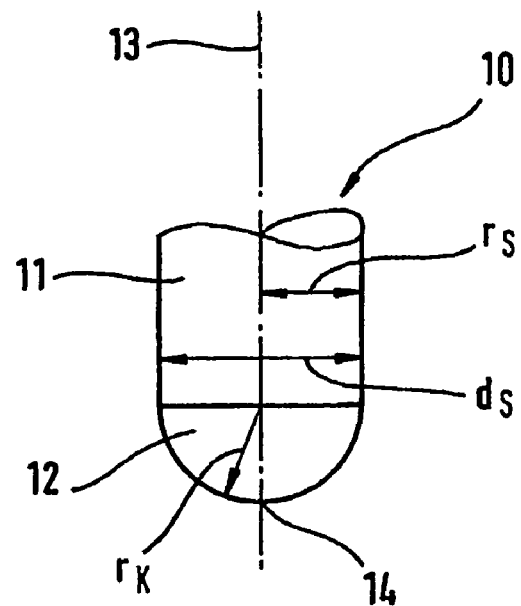
FIG. 1 illustrates a conventional cutting tool in a side view.

Example embodiments of the present invention are described in greater detail below with reference to the appended Figures. Before presenting the details of a method hereof and of a cutting tool hereof, however, a few aspects, to which reference will be made later, shall be mentioned below.

When cutting a workpiece to be machined, the surface of the workpiece is to obtain a desired three-dimensional geometry. This desired three-dimensional geometry on the surface of the workpiece is also referred to as a freeform surface.

The cutting of the workpiece to be machined occurs with the aid of a cutting tool, a so-called cutter. For purposes of machining the workpiece, the cutting tool or cutter is moved relative to the workpiece. The movement of the cutting tool or cutter relative to the workpiece is described by so-called tool coordinates, the tool coordinates defining the position of a tool reference point. The movement of the tool reference point in cutting the workpiece is referred to as the tool path or cutting path.

The cutting tool has a tool shank as well as a tool head attached to the tool shank. When cutting, the tool head comes into contact with the workpiece to be machined. The properties of a cutting tool are determined by several geometric parameters that are generally specified in a tool coordinate system. This tool coordinate system originates in the tool reference point, in which an axis or axis of symmetry of the tool shank intersects with one end or one tip of the tool head. Starting from this origin of the tool coordinate system, a first axis of the same extends in the direction of the axis of symmetry of the tool shank. The remaining axes of the tool coordinate system each extend perpendicular with respect to the latter.

The parameters by which the properties of a cutting tool are defined in the tool coordinate system are, e.g., a diameter or radius of the tool shank, a diameter or radius of the tool head, a horizontal coordinate of a radius center point of the tool head as well as a vertical coordinate of the radius center point of the tool head, etc. Parameters such as angles between line segments and horizontal or vertical axes of the cutting tool are possibly included as well, the vertical axis extending in the direction of the tool axis and the horizontal axis extending perpendicularly with respect to this tool axis of the cutting tool.

The cutting of a workpiece for producing a defined three-dimensional freeform surface occurs by so-called five-axes cutting. In five-axes cutting, the cutting tool may be moved along five axes relative to the workpiece to be machined. Three axes are used for the linear movement of the cutting tool relative to the workpiece such that every point in space may be accessed. In addition to this linear movement along the so-called linear axes, the cutting tool may also be moved around a swivel axis as well as a tilting axis for undercutting. Rotational movements of the cutting tool are possible along the swivel axis as well as the tilting axis. This makes it possible to access all points in space without collision. The swivel axis as well as the tilting axis are also generally referred to as rotary axes.

FIG. 1 illustrates a conventional cutting tool 10 that may be used in accordance with conventional systems for cutting freeform surfaces on workpieces.

Cutting tool 10 as illustrated in FIG. 1 has a tool shank 11 as well as a tool head 12 attached to tool shank 11. Tool shank 11 has a diameter $d_S$ and a radius $r_S$, where $r_S = d_S/2$. Tool head 12 has a radius $r_K$, radius $r_K$ of tool head 12 corresponding to radius $r_S$ of tool shank 11 in the case of the cutting tool illustrated in FIG. 1. Accordingly, for cutting tool 10 illustrated in FIG. 1, $rK = rS = dS/2$. Such a cutting tool is also referred to as a spherical cutter. As illustrated in FIG. 1, tool head 12 does not protrude laterally beyond an outer lateral surface of tool shank 11.

FIG. 1 furthermore illustrates an axis 13 of tool shank 11. Axis 13 of tool shank 11 intersects one end or one tip of tool head 12 at a point 14, point 14 forming a point of origin for a tool coordinate system.

Figure 2:
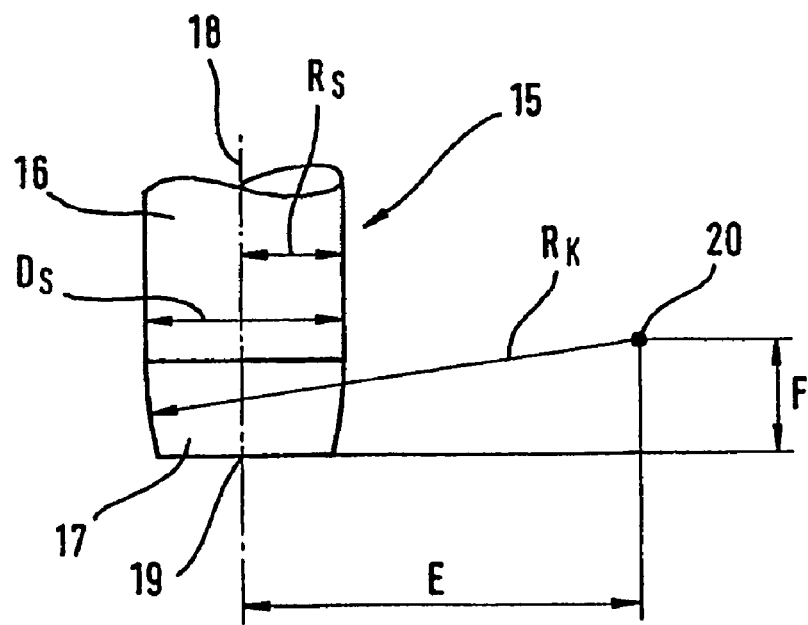
FIG. 2 is a side view of a cutting tool according to an example embodiment of the present invention.

FIG. 2 illustrates a cutting tool 15 according to an example embodiment of the present invention. Cutting tool 15 includes a tool shank 16 and a tool head 17 attached to tool shank 16. Furthermore, FIG. 2 illustrates an axis or axis of symmetry 18 of tool shank 16 as well as a point 19, at which axis of symmetry 18 of tool shank 16 intersects one end or one tip of tool head 17.

A radius $R_K$ of tool head 17 is greater than a radius $R_S$ of tool shank 16. Therefore: $R_K > R_S$. Also in cutting tool 15, tool head 17 does not protrude laterally beyond an outer lateral surface of tool shank 16.

As illustrated in FIG. 2, radius $R_K$ of tool head 17 is greater than radius $R_S$ of tool shank 16, e.g., greater than the double radius $R_S$ of tool shank 17 or its diameter $D_S$. Therefore: $R_K \gg R_S$.

Thus, FIG. 2 illustrates that a radius center point 20 of tool head 17 of cutting tool 15 does not lie in a region of the tool shank, as in the case of spherical cutter 10 illustrated in FIG. 1, but rather outside of the same. The position of radius center point 20 is determined by a horizontal coordinate E and a vertical coordinate F in the tool coordinate system, a point of origin of this tool coordinate system lying in point 19.

It should be noted that although radius $R_K$ of tool tip 17 is greater than radius $R_S$ of tool shank 16, it is however smaller than a smallest radius of curvature of the freeform surface to be cut. This may ensure that there is a low residual line formation and that the line spacing during cutting is thereby increased and the cutting time reduced. On the other hand, collision-free machining of the workpiece may be ensured.

Cutting tool 15 may be used for manufacturing rotationally symmetric, disk-shaped or ring-shaped components. These components may be rotor disks having integrated blading, i.e., so-called bladed disks, which are also referred to as blisks. These may be used in aircraft engines.

Furthermore, method for cutting freeform surfaces may be provided hereby. When cutting freeform surfaces, cutting tool 15 cuts a workpiece such that the desired freeform surface may be obtained. For this purpose, cutting tool 15 is moved along several defined cutting paths relative to the workpiece. Cutting tool 15 as illustrated in FIG. 2 may be used.

First cutting paths as illustrated in FIG. 1 may be produced in a first step with the aid of spherical cutter 10 if a CAM system used does not support special cutters. For spherical cutter 10 as illustrated in FIG. 1, radius $r_K$ of tool head 12 corresponds to radius $r_S$ or half of diameter $d_S$ of tool shank 11. Spherical cutters 10 are supported by a conventional CAM system. From these first cutting paths, second cutting paths are produced in a second step for the specific cutting tool to be used, whose radius $R_K$ of tool head 17 is greater than radius $R_S$ of its tool shank 16. The cutting tool to be used may be a cutter hereof.

Normal vectors of the workpiece surface to be cut are produced for ascertaining the second cutting paths for cutting tool 15 to be used from the first cutting paths that were produced by using spherical cutter 10. The first cutting paths include a plurality of support points, a normal vector of the workpiece surface to be cut being produced for each support point of the first cutting paths. For producing the second cutting paths for the specific cutting tool 15 to be used, the support points of the first cutting paths are shifted relative to the corresponding normal vectors, that is, in the direction of the normal vectors. For this purpose, the support points are shifted by the difference between radius $r_K$ of tool head 11 of spherical cutter 10 and radius $R_K$ of tool head 17 of the cutting tool 15 actually to be used. Expressed in other words, the support points are shifted such that a point of contact of the cutting tool 15 to be used on a surface of the workpiece to be cut corresponds to the point of contact of spherical cutter 10 and is always in the region of the radius of the tool head of the cutting tool 15 to be used.

In this shifting of the support points, the coordinates that describe the position of the radius center point 20 of tool head 17 of cutting tool 15 are taken into account. As already mentioned above, this radius center point 20 of cutting tool 15 no longer lies on axis 18, but is rather defined by horizontal coordinate E and around vertical coordinate F. On the basis of these characteristic quantities and the corresponding characteristic quantities of spherical cutter 10, it is possible to perform the shift of the support points.

Consequently, according to the method, first cutting paths are produced, e.g., in a first step, with the aid of a spherical cutter, the radius $r_K$ of the tool head corresponding to the radius $r_S$ of the tool shank. These first cutting paths serve as ancillary cutting paths. It is not a spherical cutter that is to be used, but rather a cutting tool in which the radius $R_K$ of the cutter head is greater than the radius $R_S$ of the cutter shank, without however the tool head laterally protruding beyond an outer lateral surface of the tool shank. The ancillary cutting paths are produced with the aid of a spherical cutter in which the radius $r_S$ of the cutter shank corresponds to the radius $R_S$ of the cutter shank of the tool actually to be used. The actual cutting paths for the cutting tool are produced from these ancillary cutting paths. This is done by shifting the support points of the ancillary cutting paths in the direction of the normal vectors of the workpiece surface to be cut. The shift occurs by taking the radius $r_S$ or the diameter $d_S$ of the tool shank of the spherical cutter into account, these parameters corresponding to the radius $R_S$ or the diameter $D_S$ of the tool shank of the cutting tool to be used. Furthermore, the shift of the support points occurs by using radius $R_K$ of the tool head of the cutting tool and by using the radius center points of the tool heads of the spherical cutter and the cutting tool actually to be used. By a simple subtraction of the corresponding geometric parameters, it is possible to determine the magnitude of the shift of the support points.

It is possible to use cutting tools in the cutting of complex freeform surfaces on blisks, the tool heads of which have a greater radius than the tool shank of the cutting tool. This may allow for a greater line spacing to be set in the cutting process. The time required for cutting may be reduced. The effectiveness of the cutting process may be increased.

What is claimed is:

1. A method, comprising:
    producing one of (a) first cutting paths and (b) ancillary cutting paths with a spherical cutter having a tool head radius corresponding to a tool shank radius, and producing second cutting paths for the cutting tool from the one of (a) the first cutting paths and (b) the ancillary cutting paths, and
    cutting freeform surfaces on a workpiece by a cutting tool to achieve a desired freeform surface, the cutting tool including a tool head and a tool shank, the tool head having a greater radius than the tool shank, the cutting including moving the cutting tool along at least one defined cutting path relative to the workpiece.

2. The method according to claim 1, wherein the cutting includes five-axis cutting.

3. The method according to claim 1, wherein each first cutting path includes a plurality of support points.

4. The method according to claim 3, wherein the cutting includes producing normal vectors of a workpiece surface for each support point of the one of (a) the first cutting paths and (b) the second cutting paths.

5. The method according to claim 4, wherein the second cutting paths are produced in the second cutting points producing step by shifting the support points of the first cutting paths relative to corresponding normal vectors.

6. The method according to claim 5, wherein the support points are shifted in the shifting step by a difference between the radius of the tool head of the spherical cutter and the radius of the tool head of the cutting tool.

7. The method according to claim 1, wherein the cutting includes defining the radius of the tool head of the spherical cutter, a radius center point of the tool head of the spherical cutter, the radius of the tool head of the cutting tool and a radius center point of the tool head of the cutting tool in a tool coordinate system, an original of the tool coordinate system corresponding to a tool reference point in which an axis of the cutting tool intersects on end of the tool head.

8. The method according to claim 7, wherein the second cutting paths are produced in the second cutting paths producing step by shifting support points of the first cutting path by a difference between the radius of the spherical cutter and the radius of the cutting tool by coordinates of corresponding radius center points.

* * * * *